(Model.)
M. SCHMALTZ.
THRUST BEARING.
No. 564,537. Patented July 21, 1896.
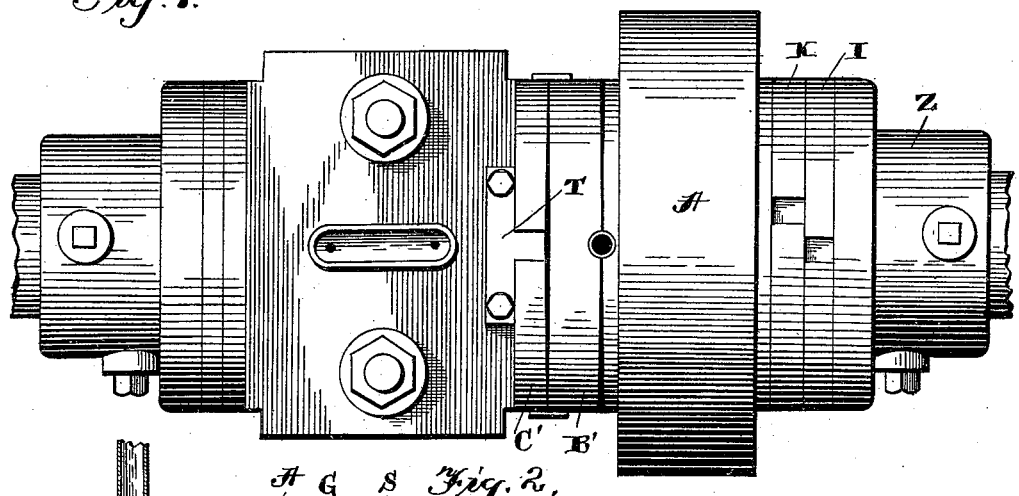
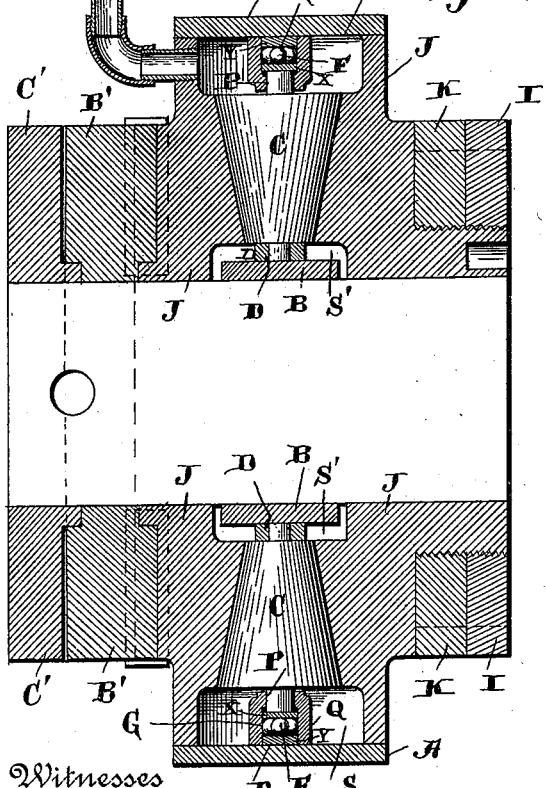
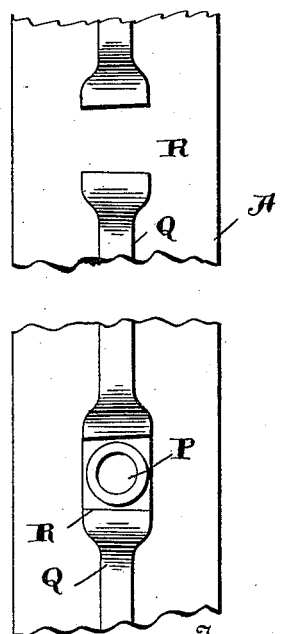
Witnesses
Geo. E. Frech.
Geo. H. Snyder
Inventor
M. Schmaltz,
per Jno. A. Gregg,
Attorney

UNITED STATES PATENT OFFICE.

MIKLE SCHMALTZ, OF BAY CITY, MICHIGAN.

THRUST-BEARING.

SPECIFICATION forming part of Letters Patent No. 564,537, dated July 21, 1896.

Application filed January 21, 1895. Renewed June 22, 1896. Serial No. 596,555. (Model.)

*To all whom it may concern:*

Be it known that I, MIKLE SCHMALTZ, a citizen of the United States, residing at Bay City, in the county of Bay and State of Michigan, have invented certain new and useful Improvements in Thrust-Bearings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in thrust-bearings for propeller and other shafts; and it consists in a circular rim, tapered rollers secured therein, and tapered disks to bear against the rollers forming the bearing, as will be more fully described hereinafter.

The object of my invention is to form a bearing for propeller and other shafts which have an endwise thrust, and which is provided with a series of friction-rollers for the purpose of decreasing the amount of friction upon the bearing, and thus effect a saving in the power required to drive the shaft and gain an increase of speed in the motion of the shaft.

In the accompanying drawings, Figure 1 is a plan view of a bearing which embodies my invention. Fig. 2 is a vertical longitudinal section of the same. Fig. 3 is a detail view of the interior of the rim.

A represents an annular rim of any suitable width and which has formed upon its inner side the web Q, which is divided into sections of equal length, and which sections are separated from each other by openings R between the ends of the sections, and which openings are made slightly tapering. In these openings are placed boxes P, which are also made slightly tapering, so that they can be removed and inserted from one side only. In these boxes P are formed shoulders upon which the inner loose plate X is placed, and upon this plate are placed the balls G, and the outer end of the box is closed by a plate Y, which is driven tightly into position.

In the boxes P the outer ends of the tapering rollers C are journaled, the inner ends of the rollers being journaled in suitable boxes D, formed in the collar B, which is fixed to the shaft. There are any desired number of these rollers C in the bearing, and they form a circle around the shaft, being separated from each other by any desired width of spaces.

Placed inside of the rim A from opposite sides and bearing against the tapering rollers C are the two conical disks J, which have suitable spaces S S' formed in their opposite edges, and which spaces form chambers for the reception of oil or other lubricant, so that the operating parts will constantly revolve in oil. Applied to the outer end of one of the disks is a collar I, which is screwed upon the hub of the disk, and the jam-nut K for the purpose of holding the shaft back against its endwise thrust. Rigidly secured to the shaft next to the end of the beveled disk is the collar Z. Against the disk upon the opposite side of the rollers C are applied the rings B' C', which form collars, and applied to them is a fastening T for the purpose of keeping the collars and the forward disk in place. The conical rollers are held evenly between the two disks J and receive the endwise thrust of the shaft, greatly reducing the amount of friction in the bearing and enabling the same expenditure of power in driving the shaft to drive it at least five per cent. faster, and with a corresponding increase of power. This invention is intended especially for the use of propeller-shafts, and will be found to give an increased speed to the vessel without the consumption of a greater amount of fuel.

Having thus described my invention, I claim—

1. In a thrust-bearing, the rim A, having the web Q, formed upon its inner side, and which web is divided into sections of equal length, and the boxes P placed in openings between the sections, combined with the plates secured in the boxes, the balls, the tapering rollers C, the boxes D, the collar B, and the shaft, substantially as shown.

2. In a thrust-bearing, the rim, the collar, suitable boxes thereon, and the rollers, combined with the disks having oil-spaces formed therein, the collar I, and nut K, applied to one disk, and a collar applied to the other, and a fastening for keeping the collar and the disk in place, substantially as described.

In testimony whereof I affix my signature in presence of two witnesses.

MIKLE SCHMALTZ.

Witnesses:
 JOHN A. GREGG,
 CARRIE GREGG.